United States Patent [19]

Sturdy

[11] 4,181,103
[45] Jan. 1, 1980

[54] GOVERNOR FOR ENGINE AND LOAD SPEEDS

[75] Inventor: Harry D. Sturdy, Wilmington, N.C.

[73] Assignee: Sturdy Truck Equipment, Inc., Wilmington, N.C.

[21] Appl. No.: 794,615

[22] Filed: May 6, 1977

[51] Int. Cl.² .......... F02D 1/04; F02D 1/08; F02D 31/00; F02D 33/00
[52] U.S. Cl. .......... 123/102; 123/103 E; 123/140 J; 123/140 MC
[58] Field of Search ........ 123/102, 103 E, 140 J, 123/140 MC

[56] References Cited

U.S. PATENT DOCUMENTS

| 2,973,051 | 2/1961 | Teetor | 123/102 |
| 3,491,734 | 1/1970 | Mackowiak | 123/102 |
| 3,495,678 | 2/1970 | Letteney | 123/102 |
| 3,747,580 | 7/1973 | Savage | 123/140 J |
| 3,889,647 | 6/1975 | Rachel | 123/102 |
| 3,916,854 | 11/1975 | Barton et al. | 123/102 |
| 4,047,507 | 10/1977 | Noguchi et al. | 123/102 |

Primary Examiner—Samuel W. Engle
Assistant Examiner—Thomas H. Webb
Attorney, Agent, or Firm—Richards, Shefte & Pinckney

[57] ABSTRACT

A monitor connected to an automotive engine, suitably monitoring pulses in the ignition system thereof electronically, and a flyball-type governor connected to the final drive train of an automotive engine transmission driven thereby, respectively operate switches for independently causing an engine-throttle-closing fixed-rate drive to run in throttle-closing direction to override the manual throttle control whenever the engine exceeds a predetermined engine speed or the vehicle approaches or exceeds a predetermined vehicle speed. Whenever both engine and vehicle are below their respective predetermined speeds and the vehicle speed is neither constant nor accelerating in the aforementioned approach range, the unoperated switches cause the throttle drive to run in throttle-opening direction to allow, but not to cause, full-throttle operation, which may be achieved by operating the manual throttle control to open the throttle to obtain full power. The dynamics of this system cause it to operate as a forcefully surging engine governor to protect the engine from overspeeding in the lower gears and to encourage the driver to shift out of the lower gears, while in the higher gears it operates as a road speed governor to limit the maximum road speed, and as a road speed control or "cruise control" to hold a constant road speed, within engine accelerational and braking capacities, so long as the driver keeps the accelerator pedal depressed beyond the normal positions required for attaining or maintaining the predetermined speeds.

14 Claims, 10 Drawing Figures

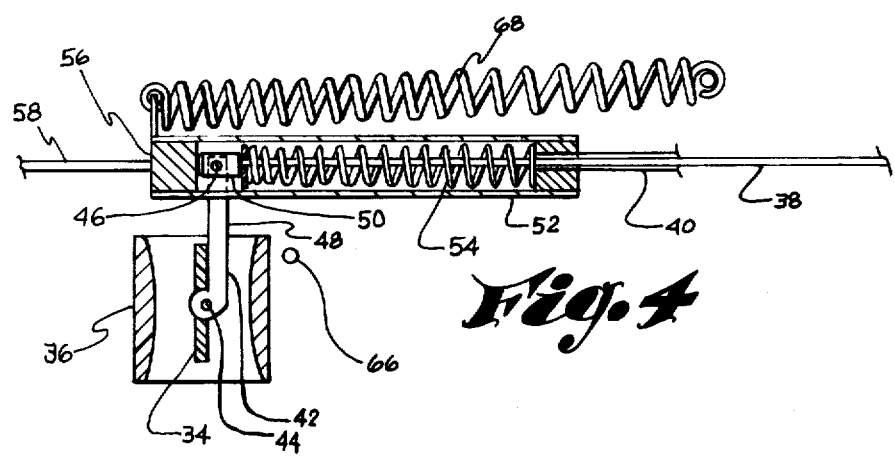
*Fig. 4*
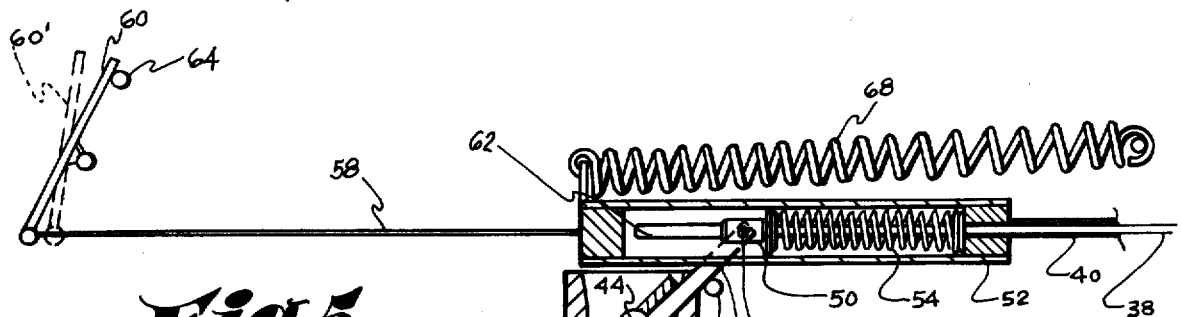
*Fig. 5*
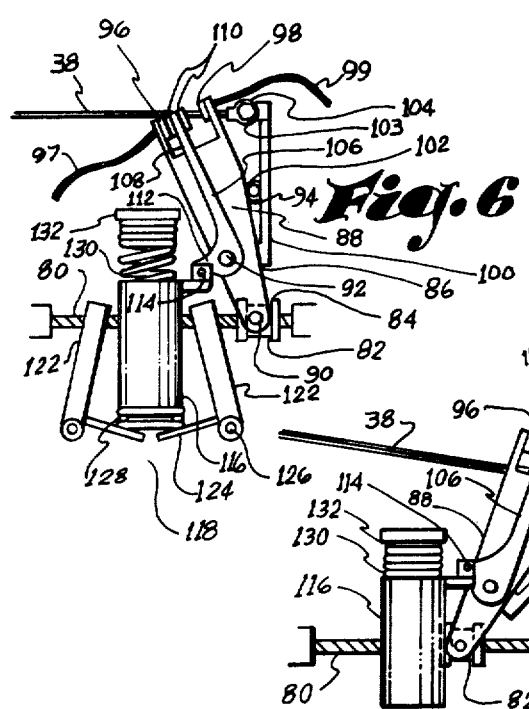
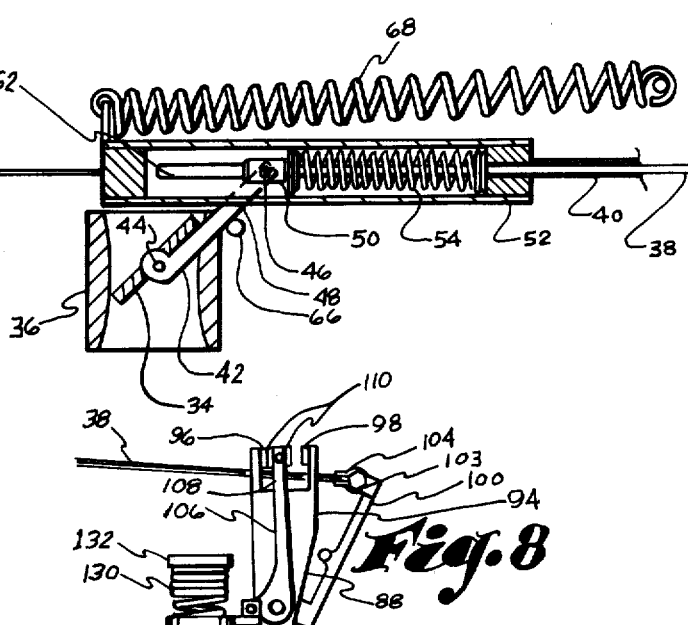
*Fig. 6*
*Fig. 8*
*Fig. 7*
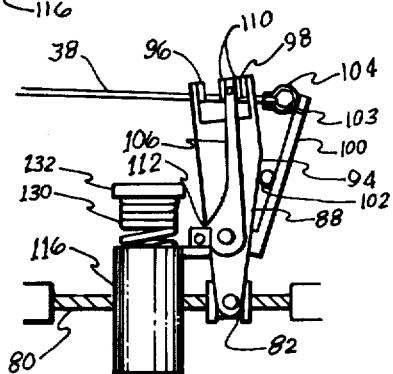
*Fig. 9*

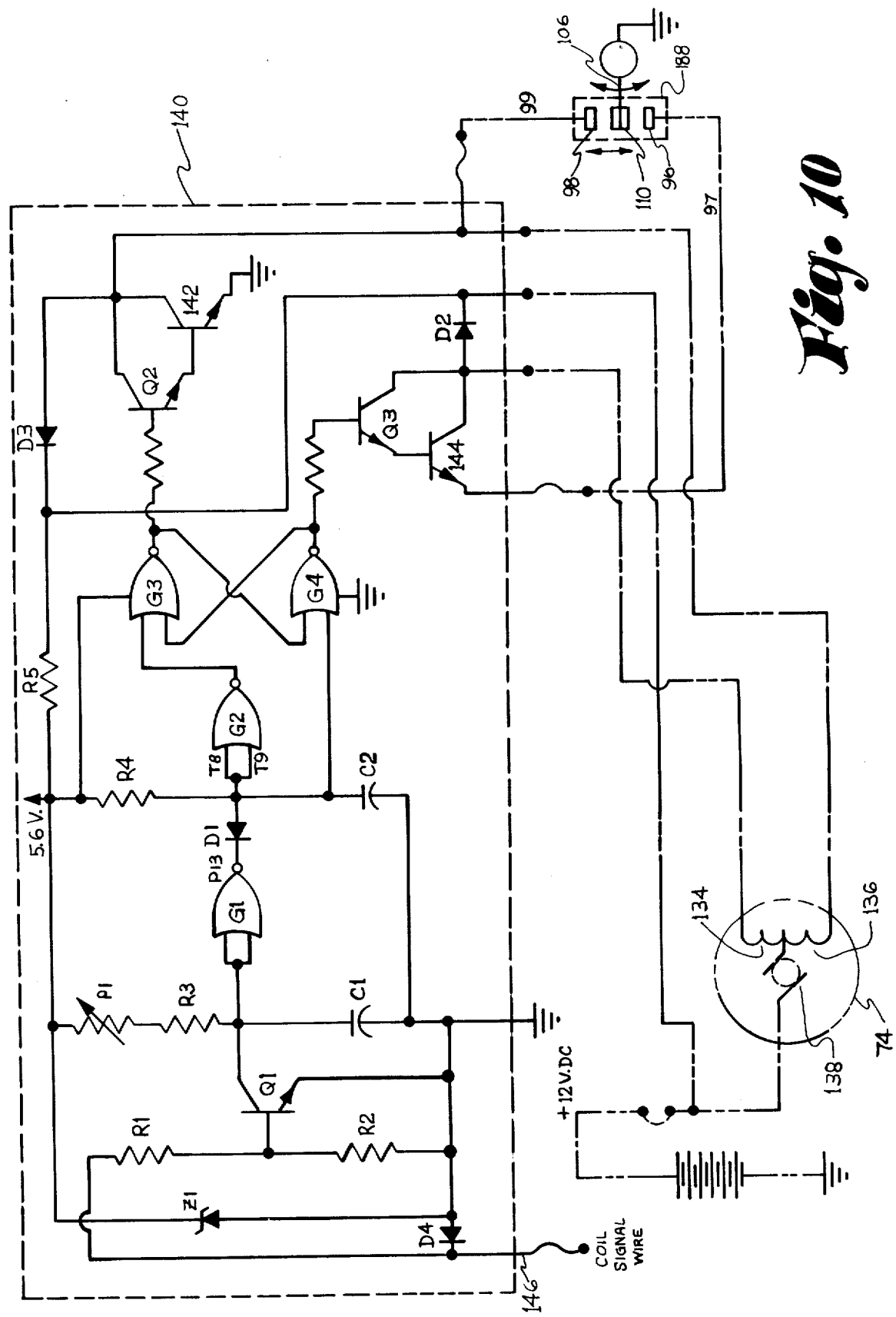

GOVERNOR FOR ENGINE AND LOAD SPEEDS

CROSS-REFERENCE TO RELATED APPLICATIONS

None.

BACKGROUND OF THE INVENTION

Engine governors which control the speed of an internal combustion engine are commonly used to control the speed of the load, such as a car or truck, by setting the governor to take control of the throttle plate of the engine carburetor when the engine speed approaches an adjustable predetermined limit, quickly closing or opening the throttle plate as required to limit the load speed. Typically, such governors include a fly-ball centrifugal actuating mechanism built into the engine ignition distributor for actuating a valve which controls the application of engine intake manifold vacuum to a diaphragm- or bellows-type actuator built into the carburetor and suitably connected to close the throttle plate as dictated by the fly-ball mechanism. Such governors require non-standard carburetors and distributors; and since only 300,000 to 400,000 vehicles are so equipped in the United States each year, the economics of manufacturing in such small quantities dictates that each of the many engine manufacturers will make such a governor available on only a very few of his numerous engine models, and even these governors will be relatively expensive, spare parts will not be generally stocked, and just due to these difficulties, the use of engine governors is discouraged.

Also, the conventional engine governor has a great technical disadvantage in its automotive vehicle applications in that while it functions extremely well to limit engine speed to a predetermined limit and thereby vehicle speed to the typically desired maximum speed in the range of 35–55 mph in the usual high, or higher, gear ratios, it also functions to limit the engine speed to the same predetermined limit when the geared transmission between the engine and the vehicle wheels is in its lower gear ratios, where the engine runs faster relative to the wheels than in the higher gear ratios. At these lower gear ratios it is desirable that the engine be able to run at speeds nearer to its upper safe operational limit, such as 4,200 rpm, in order to accelerate the vehicle swiftly through the lower gear ratios where high torque is available for acceleration, up to the normal road speed, where the governor will limit the engine speed to perhaps 3,000 rpm. But in the typical conventional engine governor the engine speed will be limited in all gear ratios to the predetermined speed, such as 3,000 rpm, and this is a serious handicap in normal vehicle operation in that it considerably slows acceleration times in getting up to normal road speed, it severely restricts acceleration for safety purposes such as pulling out of a dangerous situation by maximum acceleration to maximum safe engine speed in a low gear, it prevents driving in traffic at relatively high engine speeds in lower gears where the high available torque to the wheels is valuable for both accelerating and braking the vehicle with the engine for better vehicle control, and it may prevent automatic transmissions from shifting from lower to higher gear ratios since such transmissions are normally programmed to shift at relatively high engine speeds when the accelerator pedal holds the throttle nearly wide open.

U.S. Pat. No. 3,717,050 discloses the use in an automatic transmission of a TCS switch which in effect isolates the governor from its connection with the engine whenever the transmission is operating in one of its lower gear ratios, so that the engine can reach the speeds necessary for automatic up-shifting to the higher gear ratios without restriction. However, the use of such a TCS switch with a non-automatic transmission involves the danger that an inexperienced or lazy driver may neglect to shift out of the lower gears when he should as he accelerates, thereby allowing the engine to reach unsafe, self-destructive speeds such as the 5,000–6,000 rpm of which it is capable in the lower gears. And he may run along at such engine speeds over extended periods, which speeds are not only destructive to the engine, but also are highly detrimental to the fuel economy of the engine.

Since it is desirable to protect the engine from overspeeding, it is entirely possible to use a conventional governor to limit the engine speed to the maximum safe speed, but in this case the governor can no longer control the vehicle speed to a safe limit, and specially constructed carburetors and ignition distributors are still required. Centrifugal switches have been used in ignition distributors to cut off the ignition spark to control maximum engine speed, but the unburned fuel running through the engine in this case would be deleterious to the engine as well as uneconomical. Engine tachometers and marks on speedometer dials corresponding to maximum safe engine speeds at various gear ratios are other common devices to protect engines from overspeeding, but they depend on the alertness and goodwill of the driver and are of doubtful practical value.

U.S. Pat. No. 3,648,808 discloses engine, drive, and road speed detectors in a device for synchronizing transmission gears for shifting gear ratios, among other functions, but it neither recognizes the problems explained hereinbefore nor is capable of dealing with them cooperatively as does the apparatus of the present invention.

A Holley Road Spinner Engine Governor, Holly Carburetor Co. Model No. 2002, List No. 6651, used centrifugal valves of the general nature of that of the aforementioned U.S. Pat. No. 3,717,050 to modulate the engine vacuum applied to the diaphragm-type actuator for a throttling-valve. It was an "internal" type governor built in to the engine, and required a special carburetor and a special ignition distributor.

Once centrifugal valve was operated from the engine ignition distributor and the other from the speedometer cable to independently limit engine speed (a) to a relatively low predetermined speed corresponding to a high road speed limit, and (b) to a relatively high predetermined speed corresponding to a maximum safe rotational engine speed for extended periods. Both valves, with their associated apparatus, worked as anticipatory governors to bring engine speed smoothly to the predetermined level by modulating the throttling-valve motion as required to almost instantly close the valve to a very close approximation to the needed position, and then at a slower rate bring the valve to final position. However, the motion of the throttle valves was swift (small fractional second response) and non-uniform, the rotational speed of the speedometer cable was low for the size and delicacy of the centrifugal mechanism, and the required valve motion so precise, that the device could not be kept in proper adjustment and was subject to sudden wild oscillations from wide-open to closed throttle—as a practical matter it was unworkable and was withdrawn from the market.

The apparatus of the present invention combines a road speed monitor, an engine speed monitor, and an overriding, fixed-rate throttle-closing mechanism with a normal engine carburetor and ignition distributor to automatically and selectively control road speed or engine speed as is appropriate to ensure that road speed does not go above a predetermined limit and that engine speed makes only brief excursions of about ten percent or less above and below its predetermined limit, and without restricting either speed unnecessarily. This novel apparatus also provides a dynamically-surging, forceful physical feedback to the driver so that he is physically uncomfortable unless he shifts into a higher gear or slows down, and it provides him with a convenient "cruise control" whereby he may drive down the highway with the accelerator pedal fully depressed while the apparatus of the present invention opens and closes the carburetor throttle plate to hold the vehicle at the predetermined speed, typically within plus or minus one mph, regardless of the up- or down-hill grades, head or tail-winds, etc. encountered on the highway, within the limitations of the accelerational and decelerational capacities of the engine.

In addition to its operational advantages, the apparatus of the present invention is a standard unit which may be connected to the standard carburetor, ignition system, and speedometer cable of any engine and vehicle, so that it may be applied at the factory or in the field without inconvenience, and spare parts for this apparatus will be the same for any engine-vehicle combination.

The apparatus of the present invention should be particularly advantageous for school buses, which are frequently governed by conventional engine speed governors which limit them to comparatively low road speeds and correspondingly extremely low engine speeds which severely handicap the driver in negotiating steep grades in the lower gears at reasonably high speeds (he can only creep along) as well as in any safety situation where he needs to accelerate out of danger in a low gear. The present invention would not restrict these activities, yet would safely and effectively control the school bus road speed to the 35 or 40 mph usually considered safe for such vehicles.

SUMMARY OF THE INVENTION

Briefly described, the engine and load speed governor of the present invention operates in conjunction with an engine and a load connected by a multi-ratio transmission in which the engine has a throttle and a driver-operated throttle linkage for controlling the energy supply of the engine, and includes an overriding throttle-closing linkage and means for selectively operating the overriding linkage in throttle-closing and throttle-opening directions at predetermined rates, high engine speed responsive means for independently causing the operating means to operate in the closing direction to close the throttle, high load speed responsive means for independently causing the operating means to operate in the closing direction, and low engine speed responsive means and low load speed responsive means for jointly causing the operating means to operate the overriding linkage in the throttle-opening direction when they are concurrently responsive.

Preferably, the overriding throttle-closing linkage includes means for changing the dimensions of the driver-operated throttle linkage; and the selectively operating means operates at a rate resulting in dynamic out-of-phase surging between the high and low engine speeds and the operating of the overriding linkage in throttle-closing and throttle-opening directions when the high engine speed responsive means independently causes the operating means to operate in throttle-closing direction when the transmission is in one of the lower gear ratios thereof and when the driver-operated throttle linkage is operated fully in a throttle-opening direction; such a rate may suitably require not less than 0.2 seconds each to fully operate the overriding linkage in the throttle-closing and throttle-opening directions.

The selectively operating means includes a housing, a flexible cable and a flexible sheath thereover with the both connected at one end to the overriding linkage and the sheath affixed to the housing at the other end, a lead screw, a reversible electric motor drivingly connected to the lead screw for rotation thereof, an electrical circuit for operating the electric motor in both directions of rotation selectively, a nut mounted on the lead screw, a pivoted cable arm connected at its free end to the other end of the flexible cable and having a projection for engaging a pivoted lever for moving the cable arm for moving the cable lengthwise within the sheath for operating the overriding linkage in throttle-closing direction, the pivoted lever engaging the nut for holding the nut from rotation for traverse of the lead screw upon rotation thereof and for pivoting the lever by the nut upon such traverse. Preferably, the high engine speed responsive means includes an electrical connection to the low voltage electrical ignition pulses from the engine, decelerate and accelerate power transistors connected in the electrical motor circuit, a solid state electronic circuit for converting the ignition pulses to a voltage of magnitude proportional to the speed of the engine and for applying that voltage to the transistors for causing the decelerate transistor to become conductive and the accelerate transistor to become non-conductive for powering the motor in the throttle-closing direction when the engine speed rises and runs above a predetermined engine speed. Preferably also, the high load speed responsive means includes a fly ball mechanism, a flexible shaft connecting the transmission to the fly ball mechanism for rotation of the fly ball mechanism at a speed proportional to the speed of the load, an electrical decelerate contact carried by the pivoted lever and connected in the electric motor circuit for powering the motor in throttle-closing direction, and a pivoted contact arm connected to the fly ball mechanism for pivoting movement thereby against the decelerate contact for completing the electric motor circuit for powering the motor in throttle-closing direction when the load speed acceleratingly nears a predetermined load speed and when the load speed runs above the predetermined load speed.

In the preferred embodiment of the engine and load speed governor of this invention, the decelerate power transistor is non-conductive and the accelerate power transistor is conductive when the engine runs below the predetermined engine speed; and the low engine speed responsive means includes an accelerate contact carried by the pivoted lever and connected in the electric motor circuit in series with the accelerate power transistor, and the low load speed responsive means includes the pivoted contact arm being connected to the fly ball mechanism for pivoting movement thereby against the accelerate contact for completing the electric motor circuit through the accelerate transistor for powering the motor in throttle opening direction when the load speed deceleratingly nears the predetermined load speed and when the load speed runs below the predetermined load speed.

DESCRIPTION OF THE DRAWINGS

FIG. 4 is a diagrammatic view of the overriding throttle-closing linkage with the throttle plate open;

FIG. 5 is a diagrammatic view showing the linkage of FIG. 4 connected to the accelerator pedal and with the throttle plate closed;

FIG. 6 is a diagrammatic view of details of the fly ball mechanism and throttle-closing means with the electrical contacts in throttle-opening position;

FIGS. 7, 8, and 9 are similar to FIG. 6 except with throttle-closing means and electrical contacts in various positions; and FIG. 10 shows a schematic circuit diagram of the electronic module as connected to the schematic diagram of FIG. 3.

DESCRIPTION OF THE PREFERRED EMBODIMENT

Organization

Figure 1:
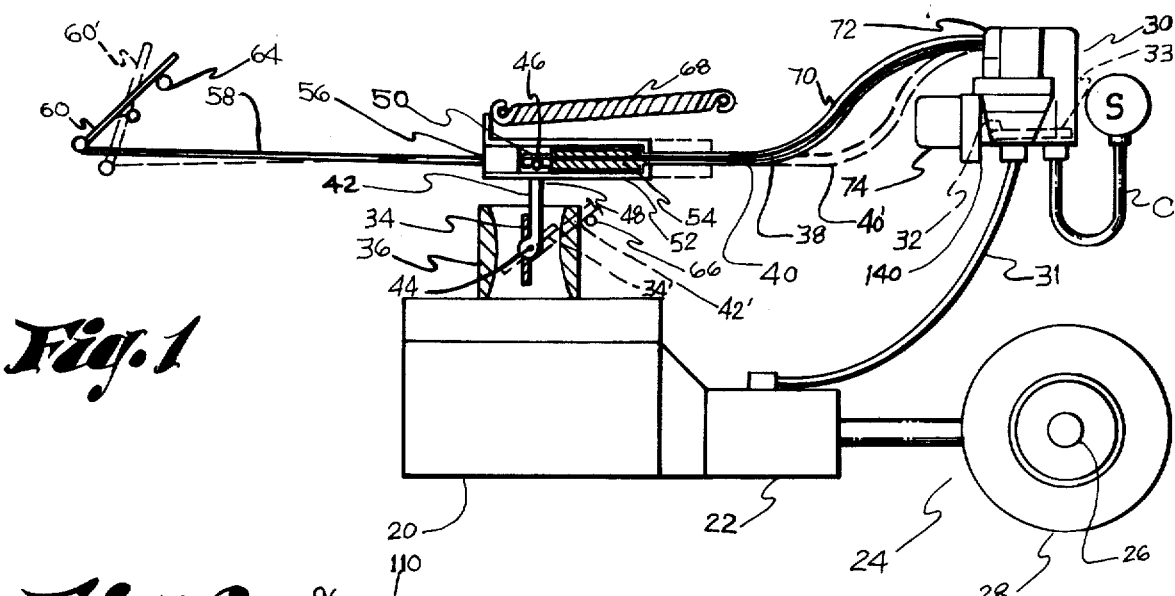
FIG. 1 is a diagrammatic view showing the engine and load speed governor of the present invention connected to a transmission, carburetor linkage, and accelerator pedal of an engine connected to vehicle wheels by the transmission.

In the illustrated preferred embodiment, as shown schematically in FIG. 1, an internal combustion engine 20 has connected thereto a transmission 22 for driving a load 24 such as the drive wheels of a truck. The transmission 22 is of the usual construction which allows automatic or manual shifting of the gears therein to provide various ratios of speeds between the engine 20 and the load 24. Typically, in a truck, the transmission 22 is shifted into "low gear" to start the load 24 moving at very low speeds, as from a standing start, so that the engine 20 can operate at a rotational speed of thousands of revolutions per minute, where it operates most efficiently, while the load 24 is eased into motion by a friction clutch or hydraulic connection (not shown) included in the transmission 22, and a very large torque is applied through the gearing of the transmission 22 to the axle 26 of the drive wheels 28 of the load 24, it being understood that the engine 20 and the transmission 22 are attached to and part of the load 24. As the drive wheels 28 pick up speed, and before the engine 20 reaches some safe limit to its short term rotational speed, such as 4,200 rpm, it is desirable to shift the transmission 22 into a "higher gear" ratio where the wheels 28 will turn at a higher rpm relative to the engine 20, and the power of the engine 20 will be applied through the transmission 22 to the wheels 28 to farther accelerate their speed until the engine 20 again approaches its safe rotational speed. This process of accelerating the engine 20 toward its maximum speed and shifting into a "higher gear" continues until the wheels 28 are driving the load or truck 24 along at a safe and suitable road speed, at which time the transmission will be in its nominal "high gear", the load or truck 24 may be running along at 50 miles per hour, and the engine 20 may be revolving at 3,000 rpm.

It is desirable that the road speed of the load 24 should be controlled or governed to some safe speed such as 55 miles per hour and it is also desirable that the speed of the engine 20 be governed or controlled to its maximum safe speed for a brief period, such as a speed of 4,200 rpm, and the engine and load speed governor 30 of the illustrated embodiment of this invention automatically and selectively controls both speeds with peculiar advantages to each.

Structure

Figure 2:
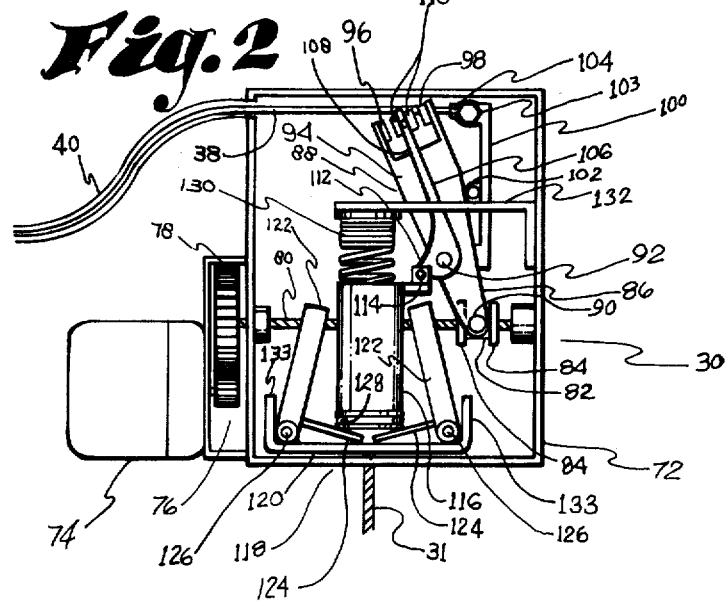
FIG. 2 is a diagrammatic view showing details of the governor proper.

The governor 30 is shown in FIG. 1 connected to the load side of the transmission 22 by the flexible rotary cable 31, which may be the typical "speedometer cable", and which transmits rotary motion at a speed proportional to the speed of the wheels 28. A gear 32 connected to the cable 31 inside the housing 72 drives an output gear 33 which is connected to a speedometer cable C for driving a speedometer S which may be located on the dashboard of the truck cab. Governor 30 is connected to the carburetor throttle plate 34 of the carburetor 36 of the engine 20 by a flexible pull cable 38 enclosed within a flexible sheath 40 of fixed length attached to and extended from the governor 30, as shown in FIGS. 1 and 2. The connection between throttle plate 34 and cable 38 is by means of the throttle arm 42 mounted on throttle shaft 44 to which the throttle plate 34 is affixed, and the ball stud 46 attached to the free end 48 of the throttle arm 42 is inserted in a socket in the cable end 50 which is permanently attached to the free end of cable 38. A linkage override capsule 52 is fixed to the free end of flexible sheath 40 and contains a cable return spring 54 which is captured and compressed within capsule 52 between the cable end 50 and the free end of sheath 40 for farther compression therebetween when the cable 38 is pulled into the governor 30 as explained hereinafter. The distal end 56 of the capsule 52 is closed and provides a stop for the cable end 50 as biased theretoward by the spring 54, and also provides a fixed attachment point for the linkage rod 58 which connects the accelerator pedal 60 to the carburetor linkage for truck-driver operation as is typical of the art. A slot 62 is provided in the side of capsule 52 to accommodate the ball stud 46 connecting throttle arm 42 and cable end 50.

The accelerator pedal 60 is shown in FIG. 1 in its "wide-open" or "full-throttle" position, that is, fully depressed by the foot of the driver of the truck against the fixed stop 64. An idling stop 66 is provided to restrain the throttle arm 42 against the typical idle spring 68 which exerts biasing force to position the pedal 60 and the throttle plate 34 at idle positions as indicated in broken outline by the numerals 60' and 34' at which the engine 20 runs at an idling speed in the absence of any foot pressure on the pedal 60. Under the conditions as shown in FIG. 1, the linkage from the pedal 60 to the throttle arm 42 is of fixed length, and depression of the pedal 60 positions the throttle plate 34 in its wide open position, fully extending the spring 68, while removal of foot pressure from the pedal 60 allows throttle arm 42 to move to its idle position 42' against the stop 66 under the bias of spring 68, thereby moving the throttle plate 34 to its idling position as indicated by the numeral 34'. This movement of the carburetor linkage includes corresponding movements of the throttle arm 42, the ball stud 46, and the capsule 52, and movement of the capsule 52 is accommodated by the curved disposition of the flexible sheath 40 as generally indicated by the numeral 70, which allows movement of sheath 40 to an idle position as indicated by the numeral 40'.

It will be observed that when flexible cable 38 is pulled into the governor 30, that spring 54 will be compressed as shown in FIG. 5, and that the cable end 50 will be moved toward the sheath 40 and away from the distal end 56 of the capsule 52, and since the ball stud 46 is inserted in a socket in the cable end 50, the linkage from the pedal 60 to the throttle arm 42 is effectively lengthened, so that sufficient movement of the cable end 50 with respect to capsule 52 will cause the throttle arm 42 to move against its stop 66 and sufficiently to move the throttle plate 34 to its corresponding idle position as indicated by the numeral 34', even though the accelerator pedal 60 is held in its wide open position by the driver. In fact, due to the longer effective length of the linkage between pedal 60 and arm 42, the pedal 60 will be held in its wide-open, fully depressed position against stop 64 under these conditions. Thus, the accelerator pedal 60 and the carburetor linkage will function as in a typical ungoverned carburetor so long as the cable end 50 is extended against the closed distal end 56 of the capsule 52, typically at engine and load speeds below those for which governing is desired. However, it will also be observed that by pulling cable 38 to compress spring 54 and to move the cable end 50 away from the distal end 56 of the capsule 52, the normal throttle control as exercised by the accelerator pedal 60 will be overridden to whatever extent is desirable to position the throttle plate 34 at any desired position between "wide open" and "idle" for accelerating and decelerating the engine 20 respectively.

As shown in FIGS. 1 and 2, the engine and load speed governor 30 includes a housing 72 on which is mounted a reversible direct current motor 74, whose shaft carries a pinion 76 which in turn drives a gear 78 mounted on a lead screw 80 so that lead screw 80 may be revolved in either direction or may be stopped. A lead nut 82 has internal threads and is mounted on the lead screw 80 for traverse therealong in a direction determined by the direction of rotation of the screw 80, and the nut 82 has square flanges 84 which are straddled and engaged by the follower arms 86 of a pivoted carrier 88 to prevent the rotation of nut 82 as lead screw 80 rotates within it. The follower arms 86 are provided with bosses 90 which are disposed between the square flanges 84 for engagement therewith, and the carrier 88 is pivoted on a shaft 92 which is fixed in the housing 72 and extends interiorly thereof. Therefore, traverse of the nut 82 along the screw 80 causes the carrier 88 to pivot about the shaft 92. The carrier 88 is formed at the end opposite the follower arms 86 by the carrier arms 94 which carry an accelerate contact 96 connected to a lead wire 97 and a decelerate contact 98 connected to another lead wire 99, these contacts being opposed and spaced apart, and insulated from the carrier 88 and from each other.

A cable control arm 100 is also pivoted on the shaft 92 and has a projection 102 thereon which engages the arms 94 so that clockwise pivoting of the carrier 88 may cause the arm 100 to pivot clockwise with it. The extending end of arm 100 is equipped with a suitable screw 103 for attachment of the pull cable eye 104 to the arm 100.

Thus, it will be seen that by rotation of the lead screw 80 in a direction to cause the lead nut 82 to traverse to the left as shown in FIGS. 2, 4, 6, 8, and 9, the carrier 88 will be pivoted clockwise, and the flexible cable 38 will be pulled into the housing 72 through the flexible sheath 40 which is fixed thereto, for movement of the cable end 50 within the linkage override capsule 52 in a direction to compress the cable return spring 54.

A contact arm 106, is shown in FIG. 2, pivoted on the shaft 92 and includes an extending end 108 having opposed contacts 110 thereon disposed between the contacts 96 and 98 for selective contact therewith. The contacts 110 are electrically connected to the arm 106, which is grounded to the housing 72 through the shaft 92, so that the contacts 96 and 98 may be selectively grounded through the contacts 110. A short crank arm 112 extends from contact arm 106 and carries a pin 114 which engages the actuator cup 116 of a fly ball mechanism 118 such as is well known in the art.

The fly ball mechanism 118 includes a rotary member 120 for rotation by the flexible cable 31, and the governor weights 122 which are attached to the lifting arms 124 which are in turn pivoted on the weight pins 126 affixed to the rotary member 120. When the rotary member 120 is rotated at sufficient speed, the weights 122 gradually move outwardly of member 120, causing the arms 124 to lift the ball thrust bearing 128 and the actuator cup 116 which are biased thereagainst by the governor spring 130 which abuts the adjustable spring stop 132. Thus, at rotational speeds of member 120 well below some predetermined speed, typically corresponding to a 55 mph vehicle speed, the spring 130 holds the actuator cup 116 down against the bearing 128, and in turn holds the arms 124 down against the member 120, while pivoting the contact arm 106 counterclockwise so that its contact 110 touches and makes electrical contact with the accelerate contact 96 as shown in FIG. 6. When the rotational speed of member 120 rises near to the predetermined speed, as set by the adjustment of stop 132 against spring 130, the governor weights 122 start to move outwardly and lift the cup 116 by means of the arms 124 and the bearing 128, thereby causing clockwise pivoting of the contact arm 106, which if continued sufficiently by increasing the rotational speed of member 120, will cause the contact 110 to touch the decelerate contact 98 for electrical connection thereto as shown in FIG. 9. Higher vehicle speeds will cause the weights 122 to move outwardly until they abut the stops 133 of rotary member 120. Typically, with the dynamic characteristics of this embodiment, the spring 130 may be adjusted to where the weights 122 begin to move outwardly at 50 mph, and at 60 mph they will abut the stops 133. The predetermined speed to which the spring 130 is adjusted is considered to be midway between, i.e., 55 mph, and in the language of the art, this is considered to be a "10 mph governor".

The fly ball mechanism 118 is therefore a high load speed responsive means above the predetermined load speed to which the mechanism is adjusted and also when acceleratingly approaching the predetermined load speed as soon as the weights 122 start to lift the actuator cup 116 (typically 50 mph when the predetermined speed is 55 mph), so that the mechanism 118 is high load speed responsive when accelerating between 50 mph and 55 mph, and at all times above 55 mph when not decelerating between 60 mph and 55 mph, as explained immediately hereafter. On the other hand, the mechanism 118 is a low load speed responsive means when decelerating between 60 mph and 55 mph and at all times below 55 mph when not accelerating below 50 mph and 55 mph, as explained just previously. That is, this is an anticipating load speed governor or regulator, and the low load speed responsive range overlaps the high load speed responsive range depending on acceleration conditions as just explained, or the ranges might be said to shift. At steady speeds in the 50–55 mph range (as when ascending a grade) the low load speed responsive range will extend to 55 mph, as the mechanism 118 acts to open the throttle wide enough to reach 55 mph, so long as the driver has the accelerator pedal sufficiently depressed. Likewise, at steady speeds in the 55–60 mph range (as when descending a grade) the mechanism 118 will act to close the throttle to retard the speed to 55 mph, and the high load speed responsive range will extend only down to 55 mph.

Figure 3:
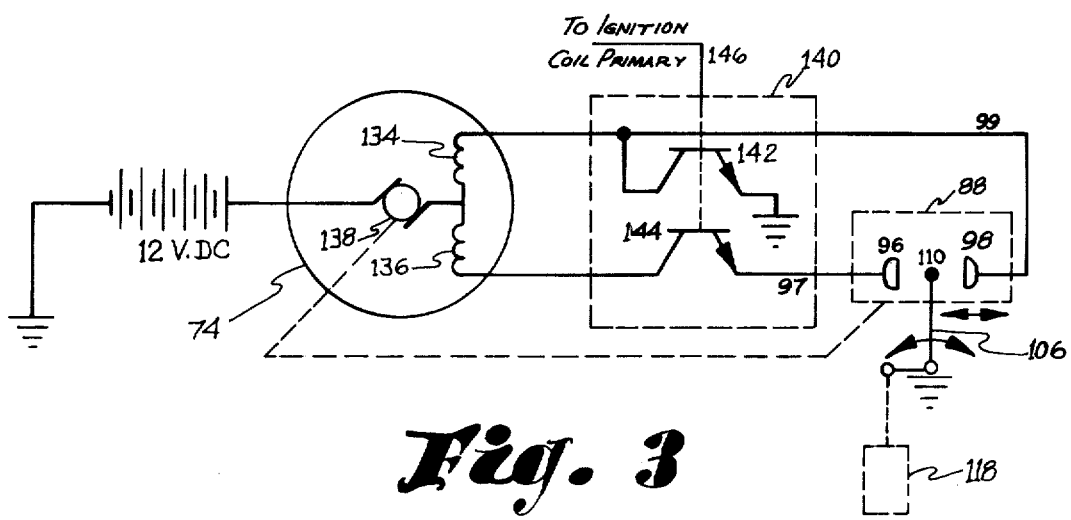
FIG. 3 is a schematic circuit diagram of the throttle operating apparatus as shown in mechanical detail in FIG. 2.

The schematic electrical wiring diagram as shown in FIG. 3 will further explain the present invention, and indicates the reversible DC motor 74 with a deceleration coil 134 and an acceleration coil 136 with one end of each connected together and through the motor brushes 138 to a source of 12-volt direct current. Energization of the deceleration coil 134 causes the motor 74 to run in a direction to cause the throttle plate 34 to be closed to decelerate the engine 20, and energization of the acceleration coil 136 causes the motor 74 to run in a direction to allow the throttle plate 34 to be opened to accelerate the engine 20. The motor 74 normally runs at the same constant speed in either direction, dependent upon the constancy of the 12-volt current supply. The other end of deceleration coil 134 is connected to the decelerate contact 98 through the wire 99, and the other end of the acceleration coil 136 is connected indirectly to the accelerate contact 96 through an electronic component to be explained hereinafter and the wire 97. Shown between the contacts 98 and 96 are the opposed contacts 110 of the contact arm 106, which is shown grounded in this circuit. The contacts 98 and 96 are mounted on the carrier 88, and it must be understood that the contact arm 106 is pivotable to touch the contacts 98 and 96, and likewise, the carrier 88 is pivotable to make the contacts 98 and 96 touch the contacts 110 selectively, as heretofore explained, and as indicated by the arrowheads in FIG. 3. The solid state electronic module 140 is shown schematically as providing a decelerate power transistor 142 connected to the decelerate contact 98 so that transistor 142 may selectively ground the contact 98 or disconnect it from ground. The accelerate power transistor 144 is provided to selectively connect the accelerate contact 96 to the accelerate coil 136 or to disconnect it. The power transistors 142 and 144 are connected as is well known in the art so that each transistor provides the equivalent of one pole of a double pole, single throw electrical switch in which the contacts of one pole are connected normally open and the contacts of the other pole are connected normally closed, respectively, so that the two poles of the switch are never simultaneously closed.

A series of low voltage electrical ignition pulses occur at a frequency directly related to the rotational speed of the engine 20 and may be monitored through an input lead 146 from the negative side of the primary of the ignition coil of the engine 20 connected to an electronic circuit such as that in electronic module 140, which builds a voltage of magnitude porportional to the rapidity of occurrence of the pulses, and that proportional voltage may be applied to, or used to trigger, the power transistors 142, 144 shown schematically here, so that at an engine speed, typically 3800 rpm, as predetermined by the adjustment of a resistor in the electronic circuits, the power transistors 142, 144 will change from non-conducting to conducting state and vice-versa, respectively, and will remain in those changed states so long as such high engine speed (i.e., engine speed above the predetermined speed, typically 3800 rpm) continues, and will revert to their original conditions when the rotational speed of the engine drops back below the predetermined value (i.e., to a so-called low engine speed). The electronic module 140 is shown in complete circuit detail in FIG. 10, which is described immediately hereinafter. The electronic module 140 is designed to measure the time between ignition pulses of an internal combustion engine 20 to determine whether or not a predetermined engine speed has been exceeded and causes the conductive states of power transistors 142, 144 to change when the predetermined speed is exceeded, as explained in the preceding paragraph according to the following description of the schematic circuit diagram shown in FIG. 10. To begin with, an input lead 146 is connected to the negative side of the ignition coil (not shown). With each ignition pulse a high voltage appears at the input lead 146, and turns transistor Q1 on. Resistors R1 and R2 form a voltage divider that causes transistor Q1 to be normally off. Registor R3, variable resistor P1, and capacitor C1 form an RC timing network which is connected to the two inputs of nor gate G1. Under normal conditions, when the engine speed is being held below the predetermined limit, as set by the adjustment of the variable resistor P1, voltage pulses coming off the primary of the ignition coil cause transistor Q1 to discharge capacitor C1 at a slow rate. This allows the voltage on C1 to charge to a voltage level which allows gate G1's output (pin P13) to be switched low between every ignition pulse and in turn discharge capacitor C2, which is part of another RC network consisting of R4 and C2. The values of R4 and C2 are selected in such a manner that gate G2 will have its inputs (terminals T8 and T9) held at a high logic level.

Should the specific frequency of ignition pulses increase to a point that exceeds the present frequency, Q1 will not allow capacitor C1 to charge to a high enough voltage level to cause the output of gate G1 to go low. If gate G1 is kept high, capacitor C2 is now allowed to charge to its full value, and causes gate G2 to switch logic states. When gate G2 changes state, the latch circuitry formed by nor gates G3 and G4 will also change state. Logic gate G3 will change from its normally low condition to a high condition, thereby turning on the Darlington pair of transistors, Q2 and 142. Gate G4 which was previously high will change to a low logic level and inhibit the Darlington transistor pair, Q3 and 144 from being turned on. Should the input pulses be reduced in frequency, transistor Q1 then is allowed to charge to a voltage that causes nor gate G1 to go low, discharging capacitor C2 and thereby changing the output transistors back to their original state, ie; Q2 and 142 off, Q3 and 144 on.

Additional aspects of the circuitry include diodes D2 and D3, which are used to prevent any high inductive voltage appearing across the output terminals of the transistors, and diode Z1 and resistor R5 which form a voltage regulator network to provide a nominal voltage of 5.6 volts for the control circuitry. Another diode D4 is used to clip any negative primary ignition coil spikes that might be found on some ignition systems and thereby result in false triggering. Variable resistor P1's function is to allow the circuit to be adjusted for engine speeds reaching from approximately 2,000 RPM to 4,000 RPM. While the above-described electronic module 140 provides a compact, foolproof, and efficient monitor for engine speed, the same function could be performed by other monitors of the nature of fly ball governor mechanisms, electrical generators, or centrifugal electrical switches so long as they actuated the equivalent of normally open and normally closed poles of a double-pole, single-throw electrical switch. Likewise, other devices than the fly ball mechanism 118 described hereinbefore, such as those monitors just mentioned, might be used to perform the same load speed monitoring function.

Operation

Consider now the operation of the governor 30 when the transmission 22 is in "low gear", and the truck driver is starting off at a low speed. Typically, once the truck has started to move, the driver will depress the accelerator pedal 60 fully, to its "wide open" position, to accelerate as rapidly as possible; and since the truck is in "low gear", the engine 20 will act rapidly to accelerate the engine toward a safe rotational speed for brief periods, such as 4,200 rpm, while the truck accelerates to a speed of say 10 miles per hour. Under such conditions, the electronic module 140 typically will be adjusted to reverse the condition of its power transistors 142 and 144 at 3800 rpm which may be a maximum safe rotational speed for prolonged periods, at which point the decelerate power transistor 142 will become conductive and ground the deceleration coil 134 of the motor 74 to cause the motor 74 to run in the deceleration direction, which causes the lead nut 82 to travel to the left as shown in FIG. 2, thereby pivoting the carrier 88 clockwise and causing the contact arm 106 and the cable control arm 100 to pivot clockwise as shown in FIG. 8, respectively picking up the cup 116 and pulling the flexible pull cable 38 into the housing 72 and through the flexible sheath 40 to compress the cable return spring 54 between the cable end 50 and the sheath 40. Even though the truck driver may have the accelerator pedal 60 fully depressed against the stop 64, and the linkage rod 58 thereby pulled to its extreme leftward position, cable end 50 will move the throttle arm 42 clockwise to close the throttle plate 34 toward its idle position 34'. Since this closing movement of the throttle plate 34 occurs at an essentially constant predetermined rate as set by the speed of the motor 74, the ratio between the pinion 76 and the gear 78, the geometry of the carrier 88, and the lead of the lead screw 82, it is typical of the "low gear" operation and the dynamics of the ratio of engine power to vehicle weight at the speeds involved that the engine will have accelerated to a speed such as approximately 4,200 rpm by the time the throttle plate 34 has closed sufficiently to cause the engine 20 to commence to decelerate. As the engine 20 decelerates from 4,200 rpm to less than 3800 rpm, the throttle plate 34 continues to close because the electronic module 140 retains the decelerate power transistor 142 in conducting mode until the engine speed drops below 3800 rpm, the throttle plate 34 continues to close because the electronic module 140 retains the decelerate power transistor 142 in conducting mode until the engine speed drops below 3800 rpm.

When the decelerate transistor 142 reverts to nonconducting mode when the engine speed drops below 3800 rpm, the accelerate transistor 144 correspondingly reverts to its conducting mode, thereby connecting the accelerate coil 136 to the accelerate contact 96. Since the fly ball mechanism 118 is set to commence its action upon the contact arm 106 only at speeds above 50 miles per hour, typically, then the governor spring 130 biases the actuator cup 116 downwardly, and thereby biases the actuator arm 106 in a counterclockwise direction to force the contact 110 to touch the accelerate contact 96 as shown in FIG. 8, thereby completing the electrical circuit through the accelerate coil 136, the accelerate transistor 144, the accelerate contact 96, and the contact arm 106 to ground to cause the motor 74 to rotate the lead screw 80 in the direction to traverse the lead nut 82 to the right, thereby rotating carrier 88 counterclockwise and allowing the pull cable 38 to be pulled from the housing 72 by the return spring 54, thereby moving the throttle arm 42 counterclockwise toward the wide open position of throttle plate 34 so long as the accelerator pedal 60 is sufficiently depressed. Typically, however, the throttle plate 34 will have closed so far by this time that the engine speed will drop to 3400 rpm before the re-opening throttle plate 34 allows the engine 20 to start to accelerate. As the engine 20 accelerates again toward the predetermined 3800 rpm reverse point for the transistors 142 and 144, the throttle plate 34 continues to open until the engine reaches the 3800 rpm speed, at which point the throttle plate 34 may be approaching wide open position, and even though the decelerator transistor 142 starts to conduct causing the motor 74 to drive the carrier 88 in the clockwise direction for closing the throttle plate 34, the engine 20 will again reach a speed of approximately 4200 rpm before it starts to decelerate, and this cycle will be repeated over and over, typically on an approximately 3.5 second cycle but workable on a cycle in the neighborhood of 0.2 seconds with lesser engine speed excursions, but more violent reversals, so long as the driver keeps the accelerator pedal 60 fully depressed and does not change the transmission into a higher gear. Such brief excursions of engine speed above the safe speed for extended operation, such as 3800 rpm, are not harmful to the engine.

This repetitive cycle recurs indefinitely because engine speed in the embodiment of this invention inherently lags throttle position in this dynamic situation; i.e., a cycle may be said to start when engine speed rises above the predetermined, say 3800 rpm speed, at which time the throttle is wide open. The throttle begins to close and continues to do so until the engine speed peaks out and then falls to the predetermined speed, which is halfway through the cycle, and at that point the throttle is at its most nearly closed position and the decelerating engine speed causes the throttle to being opening. The throttle continues to open until engine speed reaches its nadir and then rises again to the predetermined speed at the completion of a cycle, at which point the throttle is at its most nearly open position (as a practical matter it is typically wide open) and the accelerating engine speed causes the throttle to begin closing. Plotted out, the peak of throttle opening is about one quarter cycle, or ninety degrees, ahead of the peak of engine speed, and the same is true of the most nearly closed throttle position compared to the nadir of engine speed. I.e., throttle position leads engine speed by about 90° in this out-of-phase relationship, or engine speed might be said to lag throttle position by about 90°.

The cycling action of the throttle plate 34 as just described causes a forceful dynamic surging acceleration and and deceleration of the truck which is unpleasant for the driver to the extent of assuring that he will not allow this cycling to continue, but will shift the transmission into a higher gear to eliminate the cycling. After the driver shifts into the next higher gear, he will again normally keep the accelerator pedal 60 fully depressed as the engine accelerates the truck to higher speeds, and similar cycling will start again at a higher truck speed, such as 25 mph when the engine speed again reaches 3800 rpm; however, the surging will be somewhat less violent and the rpm excursions less severe in this new dynamic surging condition, as there will be less torque available to drive the wheels 28 in the higher gear with this different gear ratio thrown into the dynamics of the engine power to vehicle weight ratio. While the throttle plate 34 movements are preferred to be at constant rates, they need not be, but need only to be at predetermined rates resulting in surging as aforementioned for suitable operation of this invention.

Nevertheless, the surging will again induce the driver to shift into a higher gear, until in a conventional typical "high" gear, or perhaps in the next-to-highest gear, the truck will reach and exceed 50 mph before the speed of the engine 20 reaches 3800 rpm, and in this case, the fly ball mechanism 118 becomes operative as the governor weights 122 start to move outwardly as the rotary member 120 rotates at a speed rising or accelerating above the 50 mph point determined by the adjustment of the compression of the spring 130. The weights 122 thereby lift the actuator cup 116 as explained hereinbefore, thereby pivoting the contact arm 106 clockwise to make contact with the decelerate contact 98 as shown in FIG. 9, which grounds the deceleration coil 134 circuit and causes the motor 74 to rotate the lead screw 80 in a direction to traverse the lead nut 82 to the left, thereby pivoting the carrier 88 clockwise and causing the cable control arm 100 likewise to pivot clockwise and pull the flexible cable 38 into the housing 72 to close the throttle plate 34, overriding the wide open throttle called for by the full depression of the accelerator pedal 60 by the driver. This clockwise pivoting of the carrier 88 will continue so long as the truck speed continues to accelerate, causing the weights 122 to move farther from center, thereby causing the contact arm 106 to keep up with the clockwise movement of the decelerate contact 98 as shown in FIG. 9.

When this continued clockwise pivoting of the carrier 88 has sufficiently closed the throttle plate 34, the speed of the engine 20 will start to level off, and the carrier 88 will pivot ahead of the contact arm 106 until contact is lost between contacts 110 and 98, and the carrier 88 will cease to pivot as current will no longer be supplied to the motor 74; or the carrier 88 may pivot so far ahead of the arm 106 that the contact 110 touches the accelerate contact 96 as shown in FIG. 8 to "plug" the motor 74 to an eventual halt with the contacts 110 lying between the contacts 96 and 98, touching neither—in fact this plugging back and forth between the contacts 96 and 98 may typically occur several times very rapidly, in a second perhaps, before the contact 110 rests between the contacts 96 and 98 touching neither, dependent again on the particular dynamics of the governor, the engine, the vehicle, the road, the wind, or other factors, but in any event, the road speed will be closely controlled. At this point, the throttle plate 34 may still be far enough open so that the speed of engine 20 will continue to rise, and the weights 122 may again force the contact arm 106 to pivot clockwise to re-establish contact with the decelerate contact 98 as shown in FIG. 7, causing further clockwise pivoting of the carrier 88 and further closing of the throttle plate 34. This process will continue in smaller steps until the speed of the engine 20 is brought very smoothly to the predetermined 55 mph desired truck speed, and so long as the truck driver keeps the accelerator pedal 60 fully depressed, the truck will remain very close to the 55 mph speed as the truck goes up and downhill (within the acceleration and deceleration capabilities of the engine 20) since any small slowing of the truck, by say 1 mph, will allow the spring 130 to force the actuator cup 116 downward, thereby causing the weights 122 to move toward center, pivoting the contact arm 106 counterclockwise to make contact with the acceleration contact 96 as shown in FIG. 8 to cause the carrier 88 to pivot counterclockwise, thereby allowing the throttle plate 34 to be opened slightly under the bias of spring 54 to apply a little more power to the engine 20 to return the truck speed to 55 mph. If the uphill grade is so steep that the engine 20 cannot maintain vehicle speed, the weights 122 will move closer and closer toward center keeping the contact 110 touching the accelerate contact 96 until the carrier 88 has moved fully counterclockwise allowing the arm 106 to make its full counterclockwise travel, at which point the throttle plate 34 will be wide open. The same process operates in reverse if the truck goes downhill and picks up 1 mph, in which case the throttle plate 34 will be closed slightly to remove enough power from the engine 20 to cause the truck to decelerate back to 55 mph. If the downhill grade is so steep that the engine 20 cannot hold the vehicle to the 55 mph speed, then the weights 122 will move outwardly with the increasing speed, keeping the contact 110 touching the decelerate contact 98 until the carrier 88 has moved fully clockwise and allowing the arm 106 to make its full clockwise travel as shown in FIG. 7, at which point the throttle plate 34 will be closed to its idle position 34'. If the vehicle goes faster than 60 mph, when it again decelerates through 60 mph, the weights 122 will begin to move inwardly, allowing arm 106 to move counterclockwise, so that the contact 110 will touch the accelerate contact 96 and cause the carrier 88 to move counterclockwise, opening throttle plate 34 until the vehicle comes smoothly back to the desired 55 mph speed. On a steady upward grade, the contacts 110 may float between the contacts 96 and 98, touching neither, as shown in FIG. 2, where the throttle 34 is wide open, and the truck runs at 55 mph. This floating condition of contacts 110 is typical on any steady grade, as the carrier 88 will be automatically driven to a position which balances the throttle plate 34 position with a steady 55 mph speed.

Since the acceleration transistor 144 always remains in the conducting condition so long as the engine speed remains below 3800 rpm, and since the governor spring 130 always biases the contact arm 106 to its fully counterclockwise position so long as the truck speed remains below 50 mph, the carrier 88 is always pivoted toward its fully counterclockwise position under those concurrent conditions to a position where contact 96 cannot be touched by contact 110, thereby freeing the flexible cable 38 to be fully pulled from the housing 72 by the return spring 54, so that when the driver fully depresses the accelerator pedal 60, the throttle plate 34 is moved to its wide open position, and full power is available to the engine 20 for acceleration purposes. This wide open normal position also assures that the surging cycling of the engine will take place when engine speed accelerates above 3800 rpm with the accelerator pedal 60 fully depressed, since the governor 30 must act at its normal rate to close the throttle plate 34 through some considerable angle. The electronic module may be adjusted to govern the engine 20 at any desired predetermined speed and corresponding surging will occur about that speed, and the governor spring 130 may be adjusted to any desired predetermined truck or load speed, though it is assumed throughout this disclosure that these speeds have been adjusted to 3800 rpm and 55 mph respectively.

Thus, this preferred embodiment of the invention affords a governor which smoothly limits and controls the top speed of the truck, vehicle, or other load to a desired predetermined maximum speed, and then serves as an automatic throttle control to hold the vehicle speed close to the desired predetermined maximum speed so long as the accelerator pedal is fully depressed, and so long as the vehicle transmission is in high enough gear to reach the predetermined truck speed without overspeeding the vehicle engine. However, when the vehicle transmission is in a "low gear" such that the engine speed can reach a dangerous point before the vehicle speed reaches its desired maximum, then the fly ball mechanism 118 allows control of the engine speed to pass automatically to the electronic module 140 which acts to close the engine throttle to prevent overspeeding of the engine 20 and also interacts with the rest of the engine and load speed governor 30 and the throttle plate 34 to set up a forceful surging acceleration and deceleration of the vehicle which induces the vehicle driver to change into a higher transmission gear where the vehicle will operate more economically. Engine speed is thus automatically controlled to suit the existing conditions, whether to protect the engine from overspeeding or to protect the vehicle from exceeding the road speed limit. All this is done with an "external" or add-on apparatus, simple, sturdy, and easy to adjust; in contrast to prior art devices which have been "internal", built-in devices, requiring special carburetors and ignition distributors, as well as an additional throttling valve between the carburetor and the manifold of the engine.

The present invention has been described in detail above for purposes of illustration only and is not intended to be limited by this description or otherwise to exclude any variation or equivalent arrangement that would be apparent from, or reasonably suggested by, the foregoing disclosure to the skill of the art, such as the substitution of vacuum or mechanical or other actuators, for the electrically driven lead screw disclosed herein, the substitution of centrifugal or magnetic or other engine speed responsive means for the electronic module disclosed herein, or the substitution of magnetic or electronic or other load speed responsive means for the fly ball mechanism disclosed herein. I.e., the scope of the present invention is to be determined by the scope of the appended claims.

I claim:

1. An engine and load speed governor for an engine and load connected by a multi-ratio transmission and having a throttle and a driver-operated throttle linkage for controlling the energy supply of the engine comprising:
   (a) an overriding throttle-closing linkage;
   (b) means for selectively operating said overriding linkage in throttle-closing and throttle-opening directions at predetermined rates;
   (c) high engine speed responsive means for independently causing said operating means to operate in said closing direction;
   (d) high load speed responsive means for independently causing said operating means to operate in said closing direction; and
   (e) low engine speed responsive means and low load speed responsive means for jointly causing said operating means to operate said overriding linkage in said throttle-opening direction when concurrently responsive.

2. The engine and load speed governor defined in claim 1 in which said selectively operating means operates at a rate providing a predetermined time interval for fully operating said overriding linkage in said throttle-closing and throttle-opening directions.

3. The engine and load speed governor defined in claim 1 in which said overriding linkage comprises means for changing the dimensions of said driver-operated linkage.

4. The engine and load speed governor defined in claim 1 in which said selectively operating means comprises a housing, a flexible cable and a flexible sheath thereover both connected at one end to said overriding linkage and said sheath affixed to said housing at the other end, a lead screw, a reversible electric motor drivingly connected to said lead screw for rotation thereof, an electrical circuit for operating said electric motor in both directions of rotation selectively, a nut mounted on said lead screw, a pivoted cable arm connected at its free end to the other end of said flexible cable, and a pivoted lever having a projection for engaging said cable arm for movement thereof for moving said cable lengthwise within said sheath for said operating said overriding linkage in throttle closing direction, said pivoted lever engaging said nut for holding said nut from rotation for traverse of said lead screw upon rotation thereof and for pivoting of said lever by said nut upon said traverse.

5. The engine and load speed governor defined in claim 4 in which said high engine speed responsive means comprises an electrical connection to the low voltage electrical ignition pulses from said engine, decelerate and accelerate power transistors connected in said electrical motor circuit, a solid state electronic circuit for converting said ignition pulses to a voltage of magnitude proportional to the speed of said engine and for applying said voltage to said transistors for causing said decelerate transistor to become conductive, and said accelerate transistor to become non-conductive, for powering said motor in said throttle-closing direction when said engine speed rises and runs above a predetermined engine speed.

6. The engine and load speed governor defined in claim 5 in which said high load speed responsive means comprises a fly ball mechanism, a flexible shaft connecting said transmission to said fly ball mechanism for rotation of said fly ball mechanism at a speed proportional to the speed of said load, an electrical decelerate contact carried by said pivoted lever and connected in said electric motor circuit for powering said motor in throttle-closing direction, and a pivoted contact arm connected to said fly ball mechanism for pivoting movement thereby against said decelerate contact for completing said electric motor circuit for powering said motor in throttle-closing direction when said load speed acceleratingly nears a predetermined load speed and when said load speed runs above said predetermined load speed.

7. The engine and load speed governor of claim 6 in which said decelerate power transistor is non-conductive and said accelerate power transistor is conductive when said engine runs below said predetermined engine speed; and in which said low engine speed responsive means comprises an accelerate contact carried by said pivoted lever and connected in said electric motor circuit in series with said accelerate power transistor, and said low load speed responsive means comprises said pivoted contact arm being connected to said fly ball mechanism for pivoting movement thereby against said accelerate contact for completing said electric motor circuit through said accelerate transistor for powering said motor in throttle-opening direction when said load speed deceleratingly nears said predetermined load speed and when said load speed runs below said predetermined load speed.

8. An engine and load speed governor for an engine and load connected by a multi-ratio transmission and having a throttle and a driver-operated throttle linkage for controlling the energy supply of the engine for a range of speeds comprising:
(a) an overriding throttle-closing linkage;
(b) means for selectively operating said overriding linkage in throttle-closing and throttle-opening directions;
(c) high engine speed responsive means for independently causing said operating means to operate in said closing direction;
(d) high load speed responsive means for independently causing said operating means to operate in said closing direction;
(e) low engine speed responsive means and low load speed responsive means for jointly causing said operating means to operate said overriding linkage in said throttle-opening direction when concurrently responsive; and
(f) means for operating said overriding linkage at rates resulting in dynamic out-of-phase surging between said high and low engine speeds and said operating said overriding linkage in throttle-closing and throttle-opening directions upon said high engine speed responsive means independently causing said operating means to operate in said throttle-closing direction when said transmission is in one of the lower gear ratios thereof and said driver-operated throttle linkage is operated fully in a throttle-opening direction.

9. The engine and load speed governor defined in claim 8 in which said overriding linkage comprises means for changing the dimensions of said driver-operated linkage.

10. The engine and load speed governor defined in claim 8 in which said selectively operating means comprises a housing, a flexible cable and a flexible sheath thereover both connected at one end to said overriding linkage and said sheath affixed to said housing at the other end, a lead screw, a reversible electric motor drivingly connected to said lead screw for rotation thereof, an electrical circuit for operating said electric motor in both directions of rotation selectively, a nut mounted on said lead screw, a pivoted cable arm connected at its free end to the other end of said flexible cable, and a pivoted lever having a projection for engaging said cable arm for movement thereof for moving said cable lengthwise within said sheath for said operating said overriding linkage in throttle closing direction, said pivoted lever engaging said nut for holding said nut from rotation for traverse of said lead screw upon rotation thereof and for pivoting of said lever by said nut upon said traverse.

11. The engine and load speed governor defined in claim 10 in which said high engine speed responsive means comprises an electrical connection to the low voltage electrical ignition pulses from said engine, decelerate and accelerate power transistors connected in said electrical motor circuit, a solid state electronic circuit for converting said ignition pulses to a voltage of magnitude proportional to the speed of said engine and for applying said voltage to said transistors for causing said decelerate transistor to become conductive, and said accelerate transistor to become non-conductive, for powering said motor in said throttle-closing direction when said engine speed rises and runs above a predetermined engine speed.

12. The engine and load speed governor defined in claim 11 in which said high load speed responsive means comprises a fly ball mechanism, a flexible shaft connecting said transmission to said fly ball mechanism for rotation of said fly ball mechanism at a speed proportional to the speed of said load, an electrical decelerate contact carried by said pivoted lever and connected in said electric motor circuit for powering said motor in throttle-closing direction, and a pivoted contact arm connected to said fly ball mechanism for pivoting movement thereby against said decelerate contact for completing said electric motor circuit for powering said motor in throttle-closing direction when said load speed acceleratingly nears a predetermined load speed and when said load speed runs above said predetermined load speed.

13. The engine and load speed governor of claim 12 in which said decelerate power transistor is non-conductive and said accelerate power transistor is conductive when said engine runs below said predetermined engine speed; and in which said low engine speed responsive means comprises an accelerate contact carried by said pivoted lever and connected in said electric motor circuit in series with said accelerate power transistor, and said low load speed responsive means comprises said pivoted contact arm being connected to said fly ball mechanism for pivoting movement thereby against said accelerate contact for completing said electric motor circuit through said accelerate transistor for powering said motor in throttle-opening direction when said load speed deceleratingly nears said predetermined load speed and when said load speed runs below said predetermined load speed.

14. The engine and load speed governor defined in claim 1 and further characterized by means for operating said overriding linkage at rates resulting in dynamic out-of-phase surging between said high and low engine speeds and said operating said overriding linkage in throttle-closing and throttle-opening directions upon said high engine speed responsive means independently causing said operating means to operate in said throttle-closing direction when said transmission is in one of the lower gear ratios thereof and said driver-operated throttle linkage is operated fully in a throttle-opening direction.

* * * * *